United States Patent [19]

Jorgensen et al.

[11] 4,040,755
[45] Aug. 9, 1977

[54] TRENCH DUCT CONNECTOR

[75] Inventors: George N. Jorgensen; Frank D. King; DeForest D. Butler, all of Oxford, Ohio

[73] Assignee: Square D Company, Park Ridge, Ill.

[21] Appl. No.: 660,202

[22] Filed: Feb. 20, 1976

Related U.S. Application Data

[63] Continuation of Ser. No. 545,109, Jan. 29, 1975, abandoned.

[51] Int. Cl.² .......................... E04F 17/08; F16B 9/02
[52] U.S. Cl. .................... 403/205; 403/295; 403/364; 403/401; 52/221
[58] Field of Search .............. 52/656, 475, 758 H, 52/221; 403/401, 205, 295, 364

[56] References Cited

U.S. PATENT DOCUMENTS

| 3,429,602 | 2/1969 | Dirilgen | 52/656 |
| 3,592,493 | 5/1969 | Goose | 52/758 H |

FOREIGN PATENT DOCUMENTS

1,159,619  12/1963  Germany .......................... 403/401

Primary Examiner—James L. Ridgill, Jr.
Attorney, Agent, or Firm—Ernest S. Kettelson; Norton Lesser; Richard T. Guttman

[57] ABSTRACT

A trench duct system of the type embedded in concrete floors or the like is provided for use in the distribution of electrical power, service and/or communication cables and wiring throughout a building. The system includes a plurality of trench duct sections which are interconnected to form a predetermined distribution layout. Each section of duct includes a cover plate which is removably supported by a pair of vertically adjustable side rails. The length of the cover plate and the length of each supporting side rail may or may not be the same and will depend upon the particular layout. The exposed surface of the cover plate is flush with the plane of the finished floor. Adjoining side rails, when in angular relation to one another, are interconnected by coupling members or connectors which maintain the continuity and stability of the system.

8 Claims, 21 Drawing Figures

TRENCH DUCT CONNECTOR

This is a continuation, of application Ser. No. 545,109, filed Jan. 29, 1975 now abandoned.

BACKGROUND OF THE INVENTION

Various underfloor trench duct systems have heretofore been provided; however, because of certain inherent design characteristics, they have been beset with one or more of the following shortcomings: (a) the various components comprising the duct sections of the system were required to be custom-made at a predetermined manufacturing facility, thereby complicating the shipment of the components to a job site and often times causing inordinate delays in the installation of the system; (b) because the duct section components were custom-made, replacement thereof oftentimes was a serious and costly logistics problem; (c) modifying at the job site the length of either, or both, the cover plate and side rails of a duct section so as to compensate for unforeseen or unexpected structural situations or changes occurring during installation of the system was an extremely difficult, costly and laborious operation; (d) the coupler members or connectors utilized in interconnecting adjoining duct sections were frequently of costly construction, awkward to install and impaired the stability and continuity of the system; (e) the subassembly of the cover plate and side rails was not capable of being used in combination with either a base pan or being mounted directly onto a cellular sub-floor; and (f) warehousing of the various duct section components in numerous widespread geographical locations was not a practical or convenient way of distributing and merchandising the product.

SUMMARY OF THE INVENTION

It is an object of the invention to provide an underfloor trench duct system which is versatile and thus facilitates the designing and installing of a variety of layouts without embodying numerous custom-made components.

Further and additional objects will appear from the description, accompanying drawings and appended claims.

In accordance with one embodiment of the invention, an underfloor trench duct system is provided which includes a plurality of duct sections interconnected by a plurality of connectors to form a predetermined layout. Each duct section includes a removable cover plate supported by a pair of spaced, substantially parallel, vertically adjustable elongated side rails. Each side rail is provided with a support portion which engages and subtends a peripheral segment of the cover plate. The support portion is provided with an elongated groove which extends the full length of the side rail. The groove is adapted to accommodate a threaded fastener used to retain the cover plate and side rail in assembled relation. Each side rail is mounted on and vertically adjustable relative to a horizontally disposed base member. Angularly disposed, adjoining duct sections have corresponding side rails interconnected by a connector of unitary construction. Each connector has a first leg segment which engages and is secured to an end face of one corresponding side rail, and an angularly extending second leg segment which engages and is secured to an end face of the other corresponding side rail. Each leg segment has a support portion which is in coplanar aligned relation with the support portion of the side rail to which said leg segment is secured.

For a more complete understanding of the invention, reference should be made to the drawings wherein.

DESCRIPTION

Figure 1:
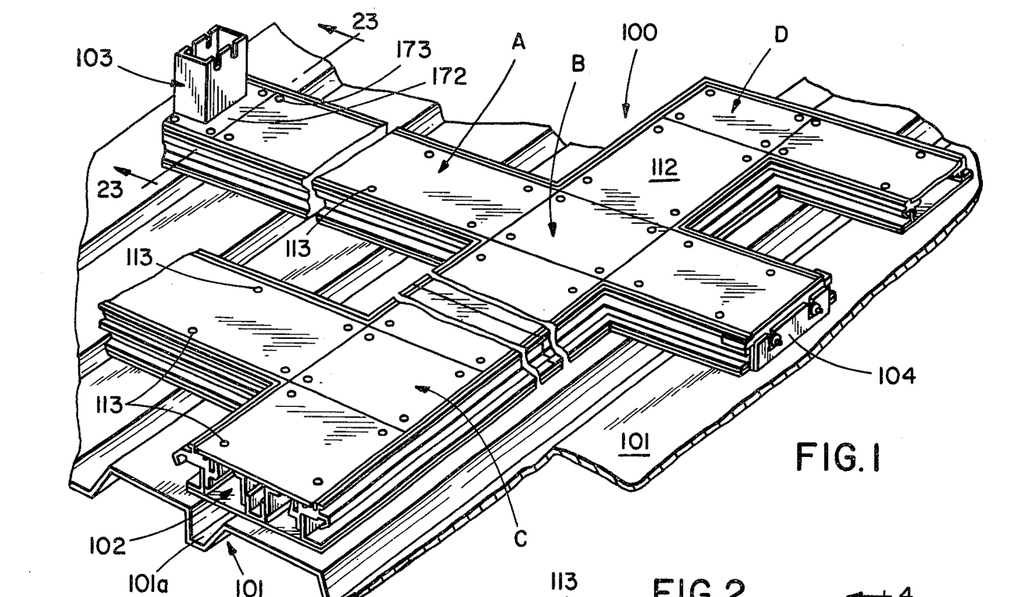
FIG. 1 is a fragmentary perspective view of one form of layout of the improved underfloor trench duct system prior to be embedded in concrete.
Figure 2:
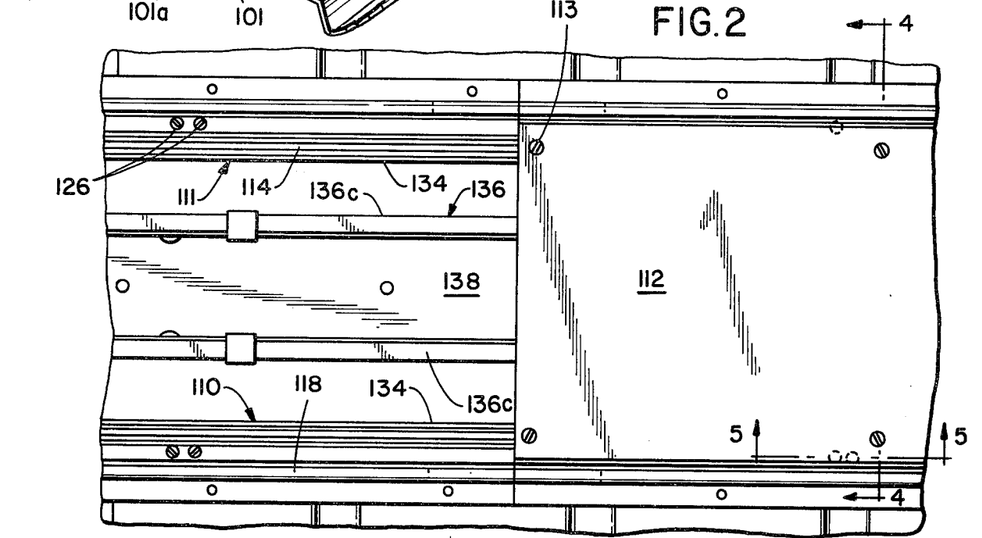
FIG. 2 is an enlarged fragmentary top plan view of a pair of aligned duct sections forming area A of the system of FIG. 1 and showing the cover plate of one duct section removed.

Referring now to the drawings and more particularly to FIG. 1, one form of the improved underfloor trench duct system 100 is shown mounted on a cellular subfloor member 101 and prior to concrete or the like being poured over the sub-floor member and between the various runs comprising the system.

For illustrative purposes only, the system shown in FIG. 1 embodies a straight run area A formed of a plurality of duct sections 102 arranged in aligned abutting, end-to-end relation; a cross-over area B formed of a plurality of duct sections arranged in an intersecting relation; a substantially T-shaped area C wherein a first duct section extends in one directon at a right angle to a second duct section; and area D wherein a plurality of duct sections are arranged in an L configuration. The number of areas A, B, C and D embodied in a system 100 will depend upon the design layout for a given building. In addition to the aforesaid area, the system will embody numerous other accessories common to such an installation such as, for example, a vertical elbow 103 and an end closure 104.

Figure 4:
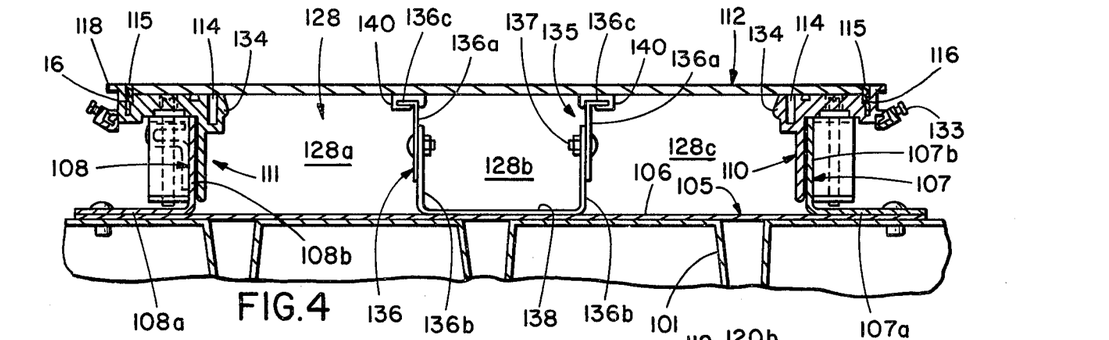
FIG. 4 is a fragmentary sectional view taken along line 4—4 of FIG. 2.

One form of the duct section 102 utilized in the system is shown in FIG. 4 and includes a metallic base pan 105 having as one component thereof a bottom plate 106 resting upon and being secured by welding or suitable fasteners to the cellular subfloor member 101. Mounted in relatively spaced relation on the upper surface of plate 106 are elongated side wall elements 107 and 108 which are preferably of L-shape in cross section. The side wall elements are arranged in spaced relation and corresponding leg portion 107a and 108a extend horizontally outwardly in opposite directions and are secured to the bottom plate 106. The other corresponding leg portions 107b and 108b extend upwardly and are arranged in spaced substantially parallel relation. Mounted on each leg portion 107b and 108b for selected vertical adjustment with respect thereto is a side rail 110 or 111. Each side rail to be hereinafter described is substantially of like configuration and preferably formed of extruded metal. Overlying the base pan 105 and supported by the side rails 110 and 111 is a planar cover plate 112 formed of metal. The width dimension of the cover plate will depend upon the spacing between the side rails. The side rails are vertically adjusted so that the exposed surface of the cover plate can be made flush with a predetermined horizontal plane which becomes the screed surface of the poured concrete.

The cover plate 112 is removably secured to the side rails by a plurality of screw fasteners 113 symmetrically arranged along the side marginal portions of the cover plate, see FIG. 1. The shank of each fastener extends through a suitable opening formed in the cover plate and is threaded into an elongated groove 114 formed in the upper supporting surface of the corresponding side rails 110 or 111 disposed beneath the particular marginal portion of the cover plate. Each groove 114 is coextensive with the length of the side rail. The fastener opening in the cover plate is pre-punched or drilled to accommodate a screw. The fasteners 113 may remain in place after the concrete has been poured or they may be discarded. In any case, however, it is preferred that the cover plate be secured to the side rails at the time the concrete is being poured. The ultimate disposition of the fasteners 113 will depend upon the esthetic effect desired, and whether the exposed surface of concrete and trench duct is to be covered over with tile, carpet or the like. The fastener may be a flat head or filister head type.

As seen in FIG. 4, the opposite side edges of the cover plate 112 engage elongated trim strips 115 formed of metal or plastic which are disposed within second elongated grooves 116 formed in the upper surface of the respective side rails 110 and 111. Groove 116, the function of which will be described more fully hereinafter, is spaced from groove 114 and is substantially parallel thereto. A portion 117 of the side rail defines a wall of groove 116 and is elevated relative to the cover plate supporting surface of the side rail. Projecting outwardly from the upper edge of portion 117 is a flange 118 which has an exposed upper surface substantially flush with the exposed surface of the cover plate 112, see FIGS. 4-6. The trim piece 115 may be of such cross-sectional configuration that it can be accommodated in various relative positions within the side rail groove 116. The relative position of the trim strip within the groove will depend upon the type of floor covering if any to be ultimately used.

Figure 6:
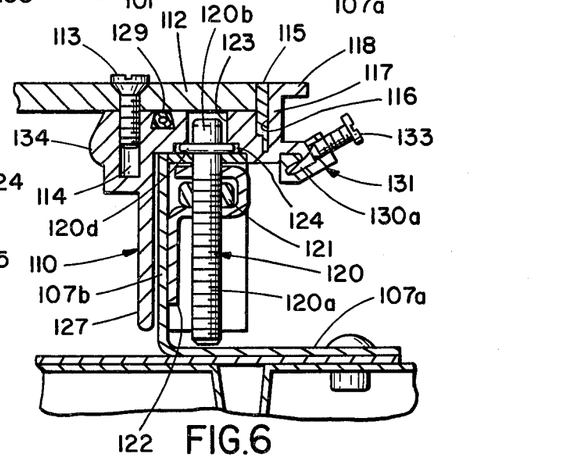
FIG. 6 is an enlarged fragmentary sectional view taken along line 6—6 of FIG. 2.
Figure 8:
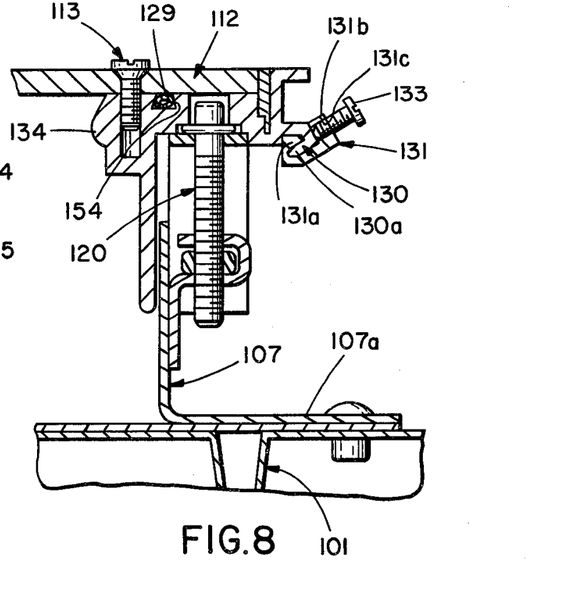
FIG. 8 is similar to FIG. 6 but showing the side rail in the same elevated position as shown in FIG. 7.

Vertical adjustment of the side rail 110 or 111 relative to the upstanding leg portion 107b or 108b of the side wall elements is effected by adjusting screws 120, only one being shown in FIGS. 6 and 8. The lower shank portion 120a of the screw is threaded into a fixed nutlike member 121 carried on a bracket 122 mounted on the outer surface of the side wall leg portion 107b. In the illustrated embodiment the brackets 122, nut-like members 121, and the lower shank portions 120a of the adjusting screws are exposed to the poured concrete and thus, proper leveling of the side rails must occur prior to hardening of the concrete.

The upper portion 120b of the adjusting screw is disposed within an opening 123 formed in the side rail 110. The upper end of the screw is recessed from the cover plate-supporting surface of the side rail. A suitable cross slot 120c is formed in the upper end of the screw to facilitate manual adjustment thereof with a screw driver or the like when the cover plate is removed. In some duct sections, however, it may be desirable to provide holes in the cover plate which align with corresponding openings 123, thereby permitting vertical adjustment of the side rails while the cover plate is assembled on the side rails. In still other duct sections, the adjusting screws may be disposed beyond the periphery of the cover plate.

Spaced longitudinally downwardly from the slotted upper end of screw 120 is an annular collar 120d which is disposed within a suitable recess 124 formed in the underside of the side rail 110 or 111, see FIG. 6. The recess 124, in the illustrated embodiment, is of channel-like configuration and extends the full length of the side rail. The size and configuration of the screw collar 120d is such that it is impassable relative to the opening 123.

Figure 5:
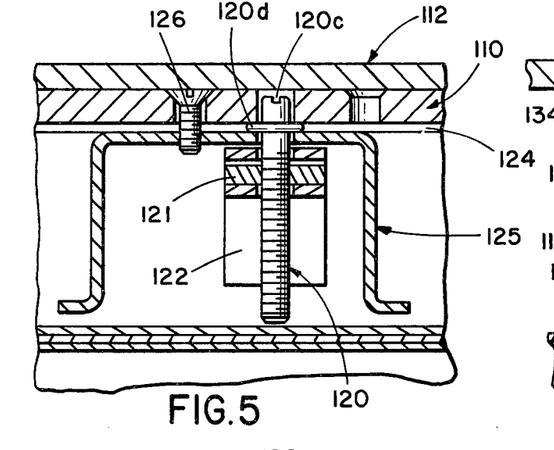
FIG. 5 is an enlarged fragmentary sectional view taken along line 5—5 of FIG. 2 and showing the side rail in a non-elevated position.
Figure 7:
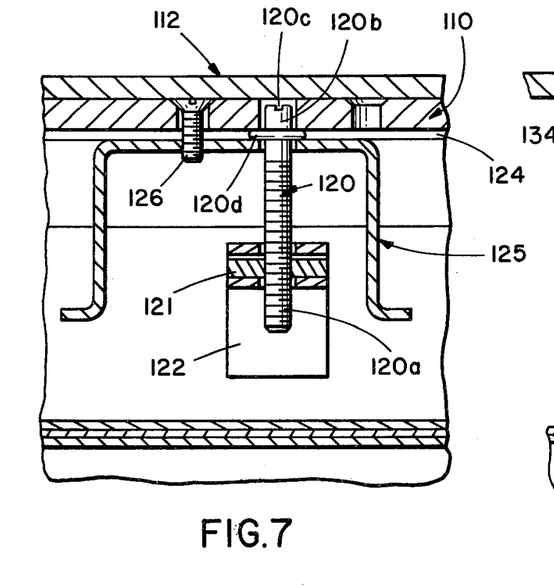
FIG. 7 is similar to FIG. 5 but showing the side rail in an elevated position relative to the base member.

The underside of the screw collar 120 is engaged by a second bracket 125 which is affixed to the undersurface of the side rail 110 or 111 by means of suitable fasteners 126, only one being shown in FIGS. 5 and 7. Thus, the screw collar 120d is sandwiched between the bracket 125 and the undersurface of the side rail. By reason of this arrangement, the side rail can be vertically adjusted without requiring the cover plate to be in place, as is the case with various prior structures of this type.

As seen in FIGS. 6 and 8, the cover plate-supporting surface of the side rail is provided with a suitable sealing gasket 129 which engages the underside of the cover plate 112 when the latter is in place.

The side rail is provided with a depending flange or skirt 127 which is juxtaposed with respect to the interior surface of the side wall upstanding leg portion 107b. The skirt cooperates with the leg portion to form a concrete barrier regardless of whether the side rail is in an elevated position, see FIG. 8, or a non-elevated position, see FIG. 6.

As aforenoted, the outer portion 117 of the side rail has the upper edge thereof terminating in a flange 118, see FIG. 6, and spaced beneath the flange and projecting outwardly from portion 117 is a tongue-like element 130 which extends the full length of the side rail. Element 130 serves a dual function: (a) it is an effective key for the concrete which is poured subsequent to the system being installed on the cellular subfloor member; and (b) it is a means for enabling aligned side rails to be coupled together in abutting relation by an elongated splicer piece 131.

Figure 3:
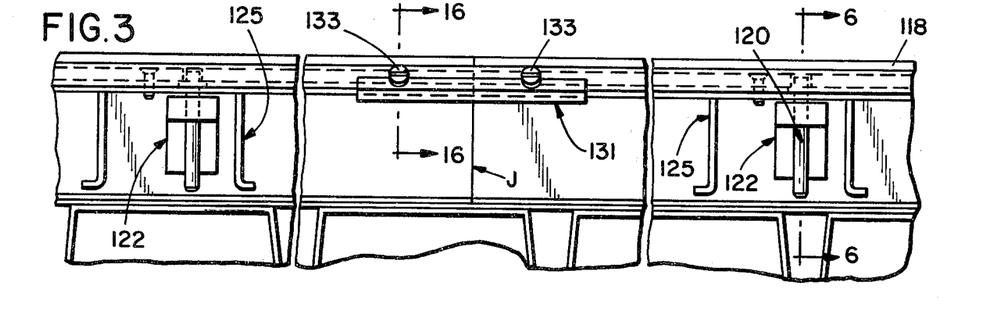
FIG. 3 is an enlarged fragmentary side elevational view of the duct sections of FIG. 2.

It will be noted in FIG. 6 that the distal portion 130a of element 130 extends downwardly and inwardly forming an elongated cavity 132 of unique cross-sectional configuration which is adapted to snugly accommodate a similarly shaped projection 131a formed on the splicer piece 131, see FIGS. 6 and 8. As seen in FIG. 3, the splicer piece 131, which is preferably an extrusion, extends a substantial distance in opposite directions from the joint J formed between the abutting duct sections 102. The splicer piece 131 has an outwardly disposed portion 131b which is adapted to cooperate with projection 131a so as to substantially encompass the distal portion 130a of the element 130. Because of the configuration of the distal portion 130a and the projection 131a, the splicer piece 131 can only move longitudinally of the side rail. Once the abutting ends of the adjacent duct sections are in properly aligned relation and the splicer piece is positioned so that the joint J is disposed substantially midlength of the piece 131, the latter is locked in place by a pair of locking screws 133 threaded into corresponding holes 131c formed in portion 131b. The holes 131c are longitudinally spaced a substantial distance apart so that one screw tightly engages one side rail and the other screw tightly engages the other side rail on duct sections forming the joint J, see FIG. 3.

The surface of the side rail facing the compartment 128, in which the cables and/or wiring are housed, is provided with a nose-like projection 134 disposed adjacent the upper portion thereof. The shape of the projection 134 is such that it may be interlockingly engaged by a resilient clip, not shown, carried on the underside of the cover plate 112 when the latter is assembled on the side rails.

As aforementioned, the trim strips 115 are of such configuration that each strip may be disposed within the groove 116 in any one of three positions. Strip 115 is a thin, elongated member of metal or plastic material. When the strip is in the position shown in FIG. 39, surface 115a is flush with the exposed surface of the cover plate 122 and the floor surface may be readily covered over with carpeting.

As shown in FIG. 4, compartment 128, which is formed by the base pan, and side rails 107 and 108 enables lengths of cable, wiring or the like to be laid therein or removed therefrom when the cover plate is removed. For convenience and/or in compliance with electrical safety codes, the compartment 128 may be formed into a plurality of auxiliary compartments 128a, 128b and 128c, thereby enabling the cables and/or wiring to be segregated within a duct section. The number and size of the auxiliary compartments formed in a duct section will depend upon the type of partitioning utilized. In FIG. 4, one form of partitioning is shown which includes a channel-shaped member 135 disposed beneath the cover plate. Member 135 has the sides 136 thereof formed in two sections 136a and 136b which are adjustably connected to one another by a bolt and nut assembly 137. The shank of the bolt extends through an opening formed in one of the sections and an elongated vertically disposed slot formed in the other section. A web portion 138 interconnects the sections 136b of member 135 and rests upon the bottom plate 106 of the duct section. Thus, by having the sides 136 of the channel-shaped member 135 vertically adjustable, the web portion 138 will rest at all times on the bottom plate 106 and the upper edges of sections 136a will engage the underside of the cover plate regardless of whether the side rails are in elevated or non-elevated positions.

The upper edges of the side sections 136a are offset in opposite directions so as to form flanges 136c which are engaged by suitable vibration damper pads 140 arranged in spaced relation along each flange. The pads engage the underside of cover plate 112 when the latter is in place. Once cables or wiring are laid in member 135, it will remain in the desired location within the compartment.

Figure 9:
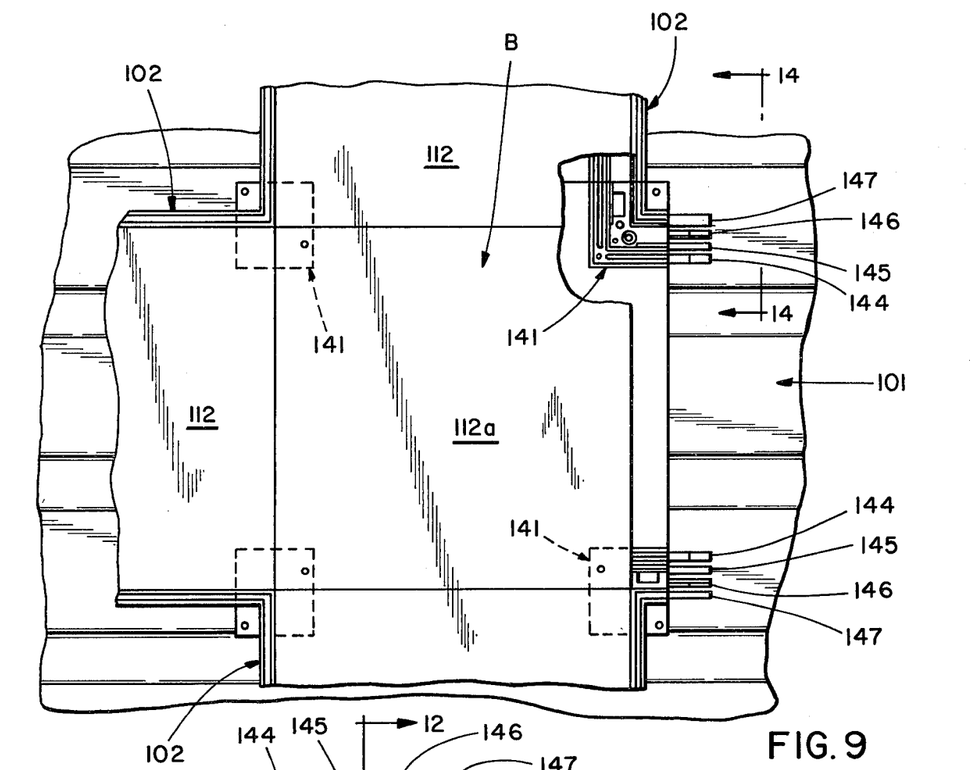
FIG. 9 is an enlarged fragmentary top plan view of area B of the system of FIG. 1 wherein a plurality of duct sections are arranged in intersecting relation, portions of adjacent cover plates being removed so as to show a connector.
Figure 10:
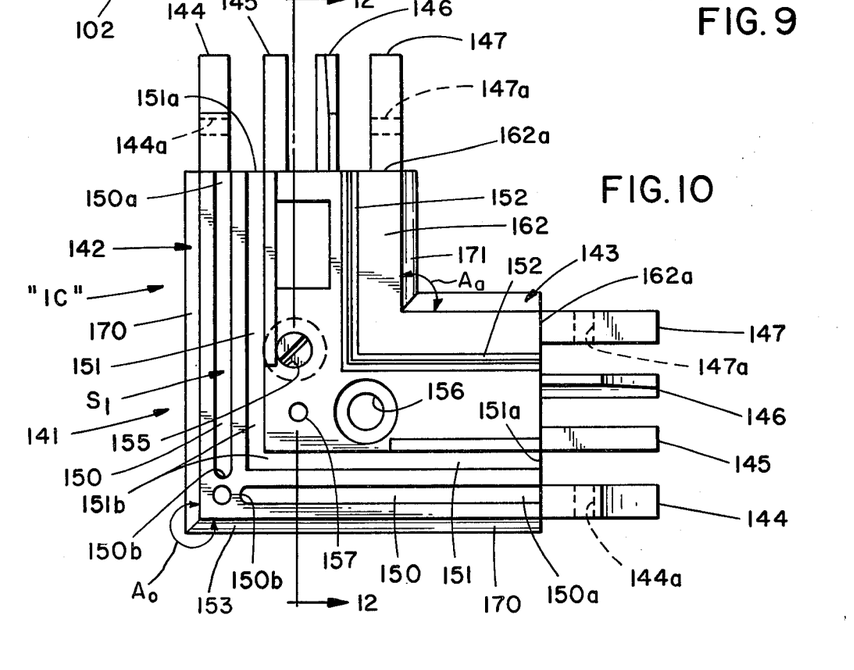
FIG. 10 is an enlarged top plan view of one form of a connector utilized in the system of FIG. 1 and shown disposed in an inside corner mode.
Figure 11:
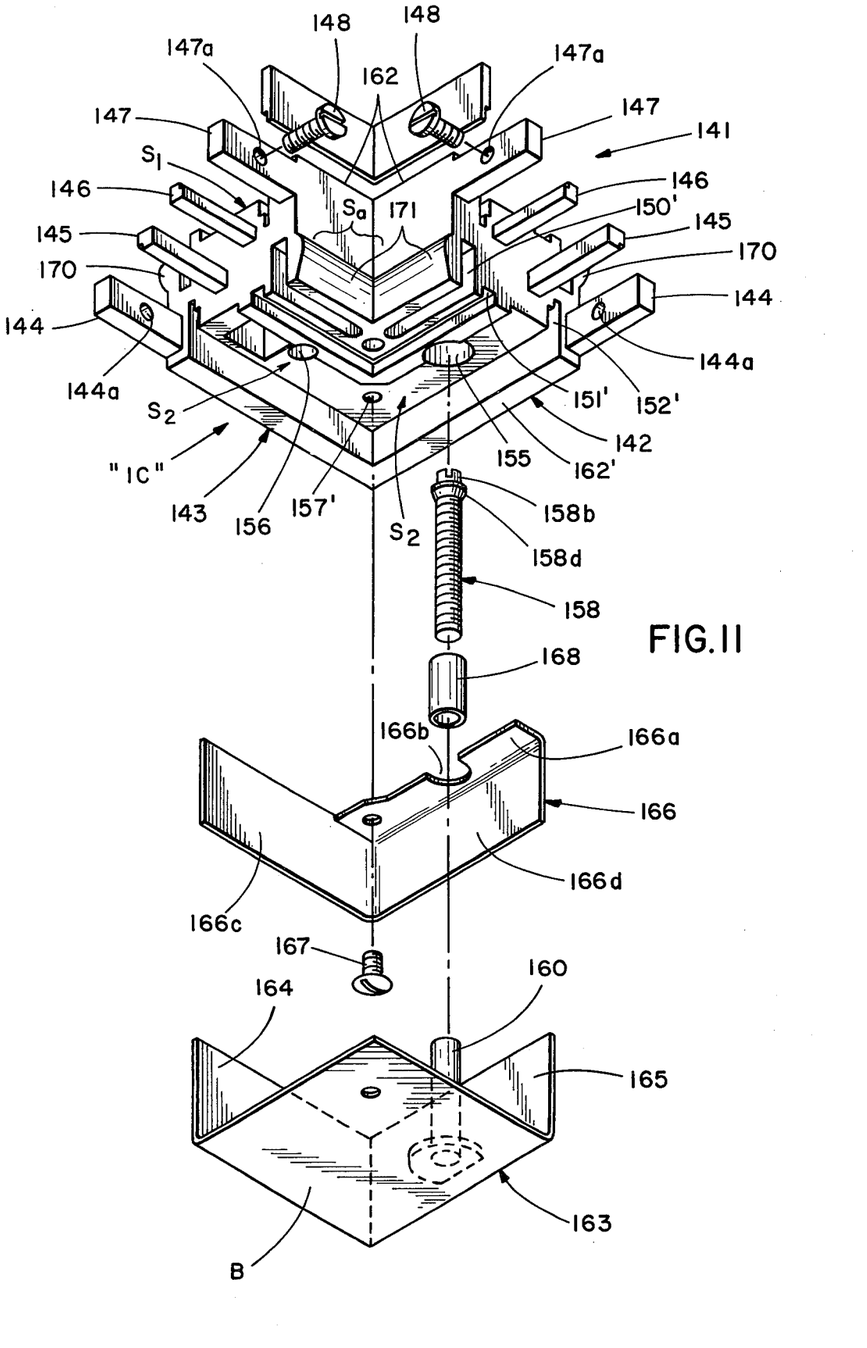
FIG. 11 is an enlarged perspective view of the underside of the connector of FIG. 10 disposed in an inside corner mode and with the components thereof in exploded relation.
Figure 16:
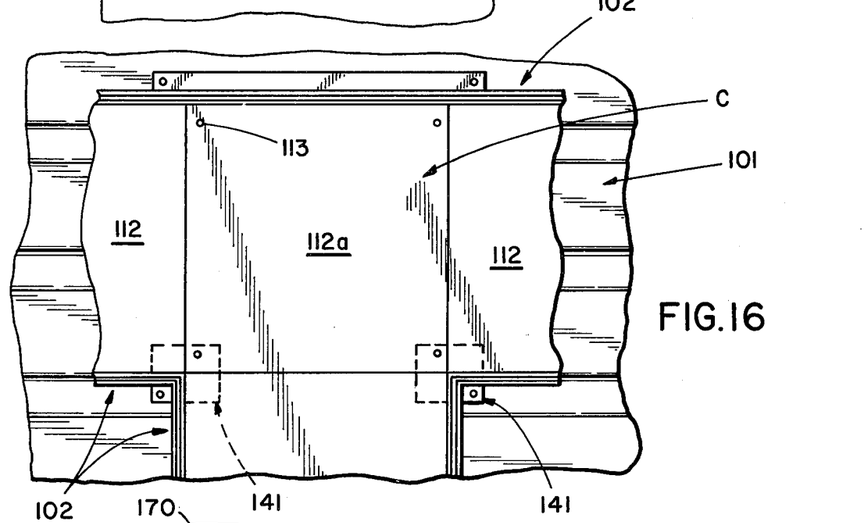
FIG. 16 is a fragmentary top plan view of area C of the system of FIG. 1 wherein a plurality of duct sections are arranged in a substantially T configuration.

As noted in FIG. 1, the duct sections comprising the underfloor trench duct system are arranged in various angular relations, thereby forming areas B, C and D. Each area embodies a plurality of connectors 141 which are adapted to interconnect the ends of adjoining duct sections. As seen in FIG. 9, area B is formed by utilizing four connectors 141, each of which is disposed in an inside corner mode "IC." FIG. 16 shows area C wherein two connectors are utilized, and each is disposed in an inside corner mode. In area D, FIG. 17, two connectors are utilized, one of which is disposed in an outside corner mode "OC" and the other is disposed in an inside corner mode. As will be hereinafter described, the same connector is utilized in both modes; in one mode the connector assumes one position and in the other mode it assumes an inverted position. In FIGS. 10 and 11 the connector 141 is shown disposed in an inside corner mode and in FIGS. 18 and 21 it is shown disposed in an outside corner mode.

Figure 14:
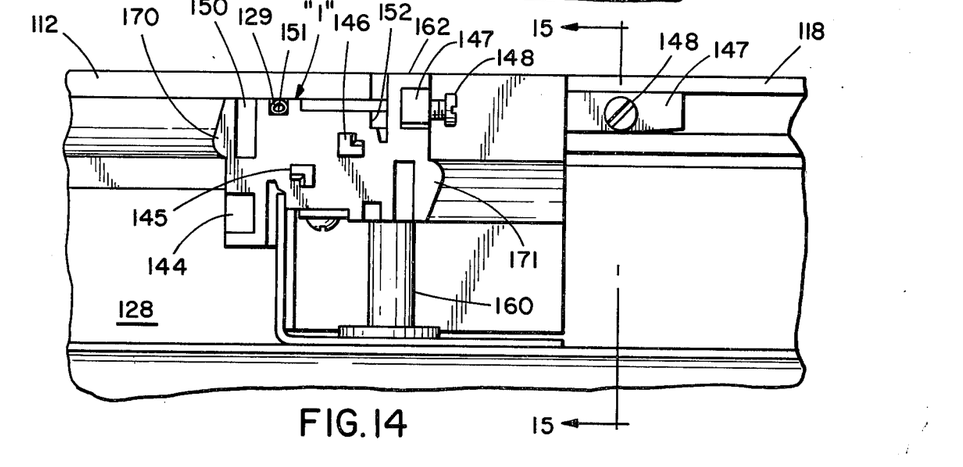
FIG. 14 is a fragmentary sectional view taken along line 14—14 of FIG. 9.
Figure 20:
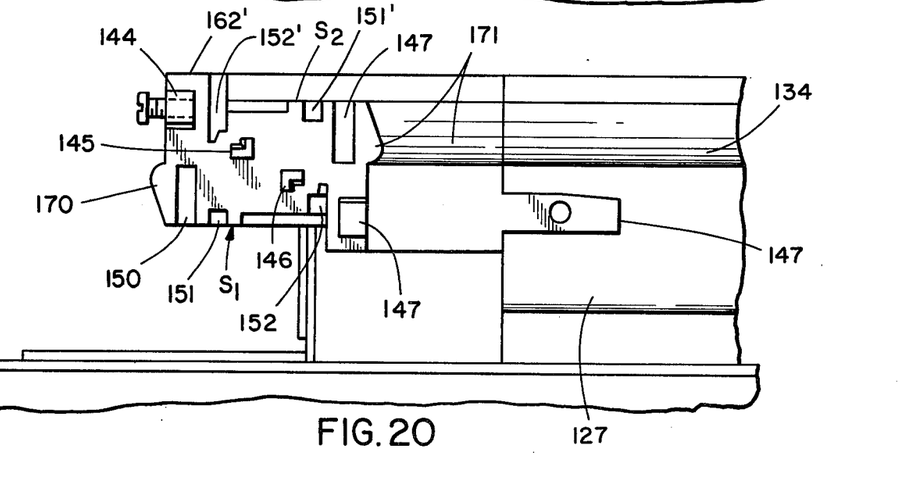
FIG. 20 is a fragmentary elevational view taken along line 20—20 of FIG. 18 and showing one leg segment of the connector connected to a side rail.

Connector 141 in the illustrated embodiment includes a support portion, preferably a metallic casting, having a pair of leg segments 142 and 143 arranged at right angles to one another to form a side surface $S_a$ forming an inner acute angle $A_a$ of 90° and to form a side surface $S_o$ forming an obtuse angle $A_o$ between the the leg segments. The segments also meet to form flat surfaces to receive the cover plates by forming a generally planar surface $S_1$ on one side and a generally planar surface $S_2$ on the side opposite to the first planar surface. The distal end of each leg segment is provided with a plurality of inflexible, longitudinally extending narrow fingers 144, 145, 146 and 147 which are adapted to interfit within suitable grooves or spaces formed in the abutting duct section. Fingers 144 and 147 are each provided with a transversely extending opening 144a or 147a which is adapted to accommodate a locking screw 148, see FIGS. 11 and 21. Each screw is manually adjusted to snugly engage an adjoining duct section, thereby retaining the connector and duct section in abutting relation, see FIGS. 11 and 20. As seen in FIG. 14, the fingers 144–147 are arranged in diagonally spaced relation on each end face.

Connector 141, as seen in FIG. 10, is disposed in an inside corner mode and the upper, or exposed, planar surface $S_1$ of each leg segment is provided with a plurality of grooves 150, 151 and 152. Groove 150 has one end 150a thereof terminating at the endface of the leg segment and the opposite end 150b terminating within the supporting portion and adjacent the juncture 153 of the leg segments. When the connector 141 and duct sections are assembled so as to form an inside corner, the groove 150 in each leg segment will be in longitudinal alignment with the groove 114 formed in the corresponding side rail 110 or 111 of the adjacent duct section. The groove 150 is sized so as to accommodate the threaded shank of a cover plate hold-down screw 113.

Groove 151 in each leg segment 142 and 143 of the connector 141 has one end 151a thereof terminating at the end face of the leg segment. The opposite or inner ends 151b of the grooves 151 interconnect, thereby forming a continuous groove from one end face to the other. Grooves 151 are aligned with the grooves 154 formed in the cover plate-supporting surfaces of the respective side rails 110 and 111 and are adapted to accommodate the sealing gasket 129, see FIGS. 6 and 8.

Grooves 152 are interconnected, as in the case of grooves 151, and are aligned with the grooves 116 formed in the respective side rails 110 and 111. The cross-sectional configurations of grooves 116 and 152 are the same and thus, grooves 152 are adapted to accommodate portions of trim pieces 115.

Disposed within the area of surface $S_1$, and delimited on opposite sides by grooves 151 and 152 are holes 155, 156 and 157 which are formed in the support portion of the connector. Hole 155 is located in leg segment 142 and is adapted to receive the slotted upper end 158b of an adjusting screw 158. As in the case of the side rail adjusting screw 120, the slotted upper end 158b is recessed from the surface $S_1$ of the connector 141. Adjusting screws 120 and 158 are of like configuration and function in a similar manner. Hole 155 is countersunk from the opposite surface $S_2$ of leg segment 142 so as to accommodate the annular collar 158d formed on screw 158. The lower end portion 158a of screw 158 is threaded into a stationary, internally threaded, upright cylindrical sleeve 160 which will be described more fully hereinafter.

Hole 156 is similar to hole 155 except that it is located in leg segment 143 and is in an inverted position, that is to say, the countersunk portions of holes 155 and 156 face in opposite directions. When the connector 141 is disposed in an outside corner mode, FIGS. 18 and 21, the countersunk portion of hole 156 will face downwardly and accommodate the collar 158d of the adjusting screw 158.

Figure 21:
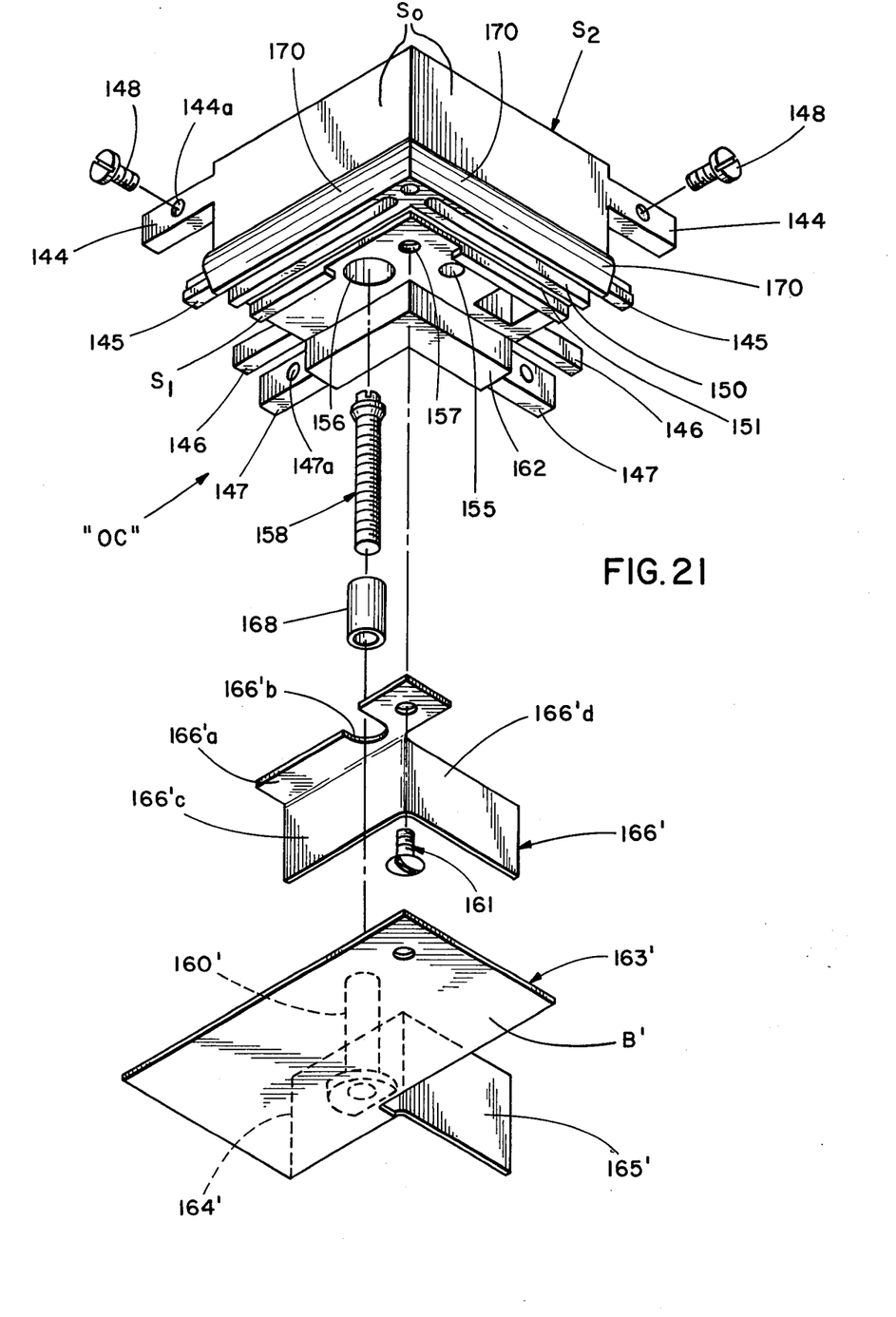
FIG. 21 is similar to FIG. 11 but showing the connector in an outside corner mode and with the components thereof in exploded relation.

Hole 157 is located at the juncture of leg segments 142 and 143 and is adapted to receive the threaded shank of attaching screw 161 when the connector is in its outside corner mode, see FIG. 21.

Surface $S_1$, of the connector 141, as seen in FIG. 10, is partially delimited by an upwardly protruding L-shaped rib-like elongated portion 162 which extends alongside acute angle side surface $S_a$ and generally parallel or coplanar with surface $S_1$ and forms a part of both leg segments 142 and 143. The end faces 162a of portion 162, when abutting corresponding end faces of adjacent side rails, cause the portion 162 to be aligned with the portions 117 of the adjacent side rails. The top surface of portion 162 is in coplanar relation with the exposed surface of the side rail flanges 118.

Figure 15:
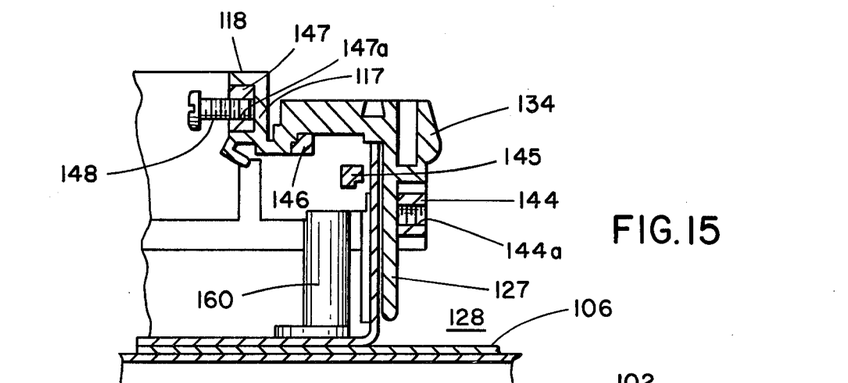
FIG. 15 is a fragmentary sectional view taken along line 15—15 of FIG. 14.

Fingers 147, which project longitudinally from end faces 162a, are each recessed from the exposed surface of portion 162 an amount equal to the thickness of flange 118 of the side rail 110 or 111 so that when the connector and side rails are assembled, the finger 147 will slide beneath the flange 118 as seen in FIG. 14. Once the connector and side rails are in proper abutting relation, the screws 148 are manually threaded into finger holes 147a until the leading or concealed ends of the screw frictionally engage the side rail portions 117 and hold the connector and side rails in assembled relation. Simultaneously with the engagement of finger 147 beneath flange 118 of the side rail, finger 146 will slidably engage a part of the underside of the supporting portion of the side rail, as seen more clearly in FIG. 15. Finger 145 will also slide beneath the side rail but will not be in contact therewith. Finger 144 also will slidably engage the surface of the side rail depending skirt 127 which forms a wall of the compartment 128 within the duct section, see FIG. 15.

As aforementioned, the adjusting screw 158 of the connector 141 is threaded into the stationary upstanding sleeve 160, see FIG. 11. The lower end of the sleeve is attached to a horizontally disposed base B of a mounting plate 163 which in turn is fixedly secured to the bottom plate 106 of the duct section base pan. The plate 163 is provided with a pair of upright angularly disposed flanges 164 and 165, the function of which will be described more fully hereinafter.

A retaining member 166, as shown in FIG. 11, is provided, which is adapted to be secured by a screw fastener 167 to the underside (surface $S_2$) of the connector 141. Member 166 includes a horizontally disposed first flange 166a which is provided with a cut-out 166b to permit the shank of the adjusting screw 158 and the upper portion of sleeve 160 to pass therethrough. Disposed within the countersunk portion of the opening 155 and encompassing a portion of the screw shank is a spacer sleeve 168. The upper edge of the sleeve 168 engages the underside of the screw collar 158d and the lower edge of the sleeve engages the first flange 166a of the retaining member 166. Sleeve 168 is impassable relative to the cut-out 166b. The interior dimension of sleeve 168 is such that the upper end portion of the upright sleeve 160 will fit therein when the connector is disposed in a non-elevated position as seen in FIG. 10.

Figure 12:
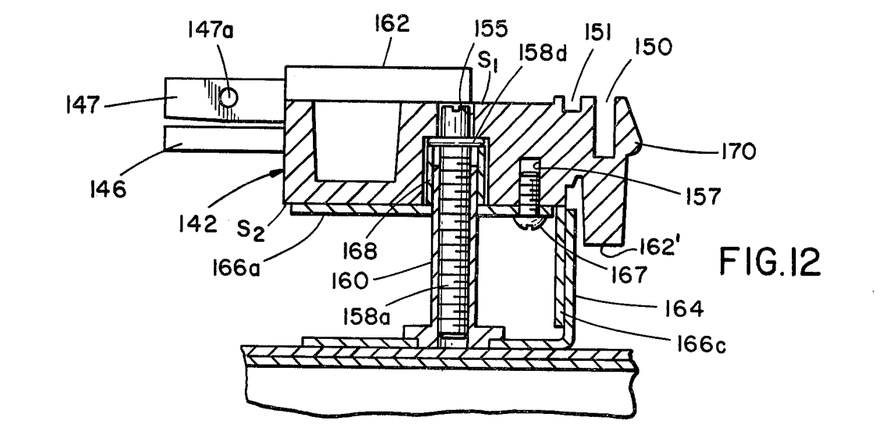
FIG. 12 is a sectional view taken along line 12—12 of FIG. 10 and showing the connector in a non-elevated position.
Figure 13:
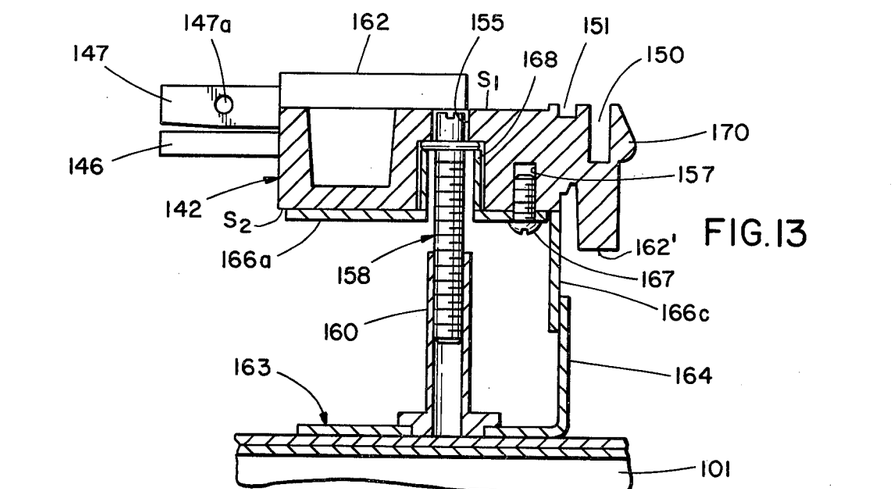
FIG. 13 is similar to FIG. 12 but showing the connector in an elevated position.

Retaining member 166 includes second and third flanges 166c and 166d which are disposed at a right angle to one another and conform to the angular disposition of the leg segments 142 and 143. Flanges 166c and 166d are disposed in sliding side-by-side relation with the upright flanges 164 and 165, respectively, formed on mounting plate 163 when the components of the connector are in assembled relation as seen in FIGS. 12 and 13. The flanges cooperate with one another to form a barrier preventing the poured concrete from finding its way into the compartments 128 formed in the connected duct sections.

As seen in FIGS. 11-13, each leg segment 142 and 143 of the connector 141 has a pair of nose-like projections 170 and 171. When the connector is disposed in an inside corner mode, as seen in FIGS. 10-13, the projections 170 are elevated relative to projections 171 and are aligned with the corresponding side rail nose-like projections 134 of the connected duct sections. Thus, with such an arrangement, the resilient holddown clips carried on the underside of the cover plate can interlockingly engage either the nose-like projections 134 or 170, thereby permitting the length of the cover plate and the lengths of the respective side rails supporting said cover plate to be unequal without adversely effecting securement of the cover plate to the side rails.

In the area C arrangement, for example, both the duct sections, forming the top of the T shape, may have side rails of unequal lengths. The corresponding longer side rails of such duct sections are aligned in end-to-end relation and are interconnected by the splicer piece 131. The other or shorter corresponding side rails of such duct sections are engaged by connectors 141 disposed in inside corner modes, see FIG. 16.

Figure 17:
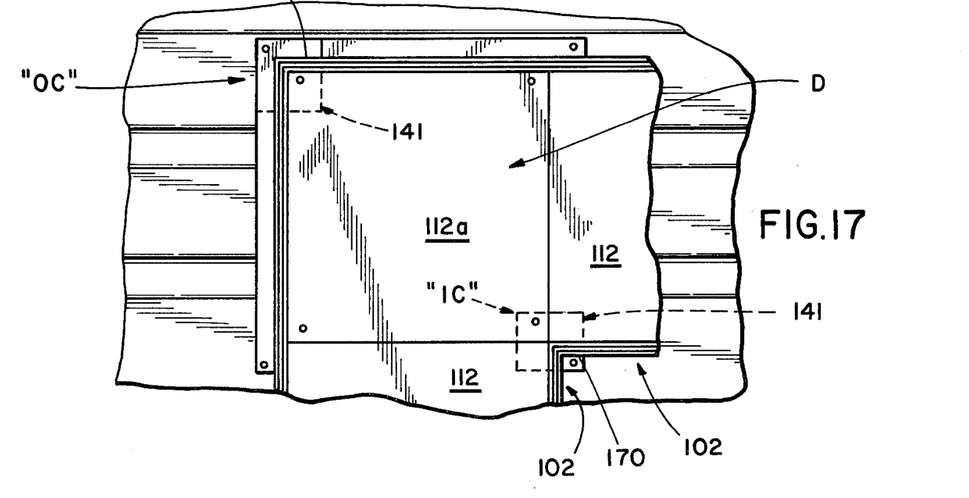
FIG. 17 is a fragmentary top plan view of area D of the system of FIG. 1 wherein a plurality of duct sections are arranged so as to form a substantially L configuration.
Figure 18:
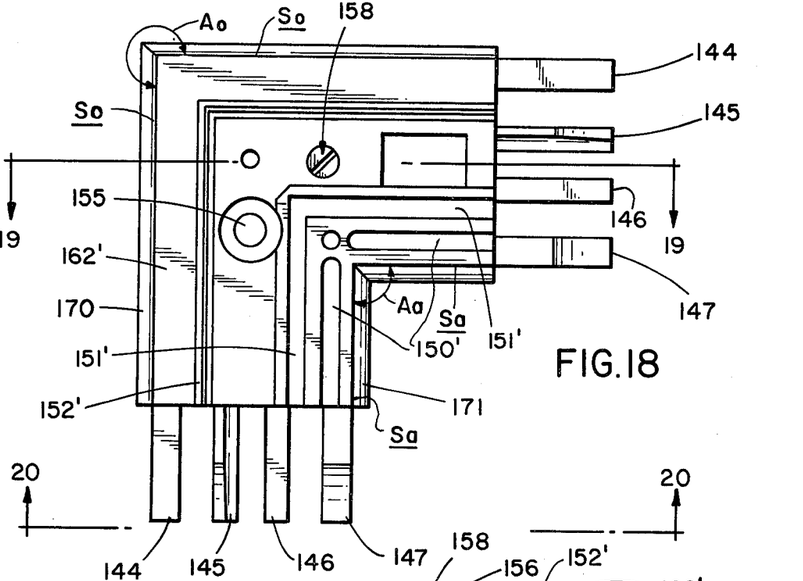
FIG. 18 is similar to FIG. 10 but showing the connector thereof utilized in an outside corner mode.
Figure 19:
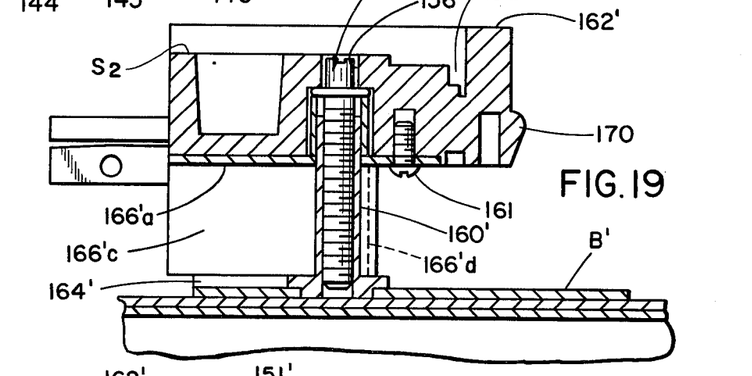
FIG. 19 is an enlarged sectional view taken along line 19—19 of FIG. 18.

Area D of the system is formed by a pair of duct sections in an L, or right angle, configuration, see FIG. 17. With such an arrangement, two connectors 141 are utilized with one of said connectors being disposed in an outside corner mode "OC" and the other connector being disposed in an inside corner mode "IC." The duct sections forming area D, each has one corresponding side rail of substantially greater length than the other corresponding side rail. The longer side rails may extend a substantial distance beyond the edges of the cover plates as shown in FIG. 17, with the result that a separate squareshaped supplemental cover plate 112A is utilized. A similar supplemental cover plate may be utilized in area C, see FIG. 16 and in area B, see FIG. 9. Where a supplemental cover plate 112A is used, hold-down screws 113 may be employed to retain the plate 112A in place during pouring of the concrete.

The connector 141, when disposed in an outside corner mode "OC," see FIGS. 18-21, assumes an inverted position relative to the inside corner mode position "IC" as seen in FIGS. 10-14, whereby surface $S_2$ of the connector faces upwardly and is engaged by the cover plate. At the same time, nose-like projections 171 are disposed in elevated positions relative to projections 170, and the countersunk end of hole 155 faces upwardly. Grooves 150', 151' and 152' are formed in surface $S_2$ and serve the same functions as the previously described corresponding grooves 150, 151 and 152 formed in surface $S_1$. In surface $S_2$, groove 150' is disposed closest to the side having the nose-like projection 171 and groove 152' is disposed closest to the side having the nose-like projection 170, see FIG. 18. By way of contrast, however, when the connector is in an inside corner mode, FIG. 10, and surface $S_1$ faces upwardly, groove 150 is disposed closest to the side having the nose-like projection 170 and groove 152 is disposed closest to the side having the nose projection 171. In a similar fashion the rib-like elongated portion 162' on surface $S_2$ is disposed adjacent the obtuse angle side $S_o$ which has the nose-like projection 170, whereas in surface $S_1$ the portion 162 is disposed adjacent the acute angle side $S_a$ having the nose-like projection 171.

As seen in FIG. 21, the mounting plate 163' and retaining member 166' for the connector, when it is in an outside corner mode "OC," have a different configuration from the corresponding plate 163 and member 166 when the connector is disposed in an inside corner mode "IC," see FIG. 11.

Mouting plate 163' is secured to the subflooring by welding or suitable means. A pair of angularly disposed upright flanges 164' and 165' are connected to the base B' of the plate but are disposed substantially outside the perimeter of the base. The internally threaded sleeve 160' is fixedly secured to the base B'.

Retaining member 166' includes a pair of depending angularly disposed flanges 166'c and 166'd which are adapted to slidably cooperate with the respective flanges 164' and 165' of the mounting plate 163' in the same manner as in the case of member 166 and plate 163 so as to form a concrete barrier. A flange 166'a extends laterally from the upper edge of flange 166'c and is adapted to be secured by screw 161 to surface $S_1$ and thereby retain the spacer sleeve 168 and adjusting screw 158 in proper assembled relation within hole 156. Flange 166'a is provided with a cut-out 166'b through which the upper end of sleeve 160' extends when the connector is in a non-elevated position, see FIG. 19.

As previously mentioned, the side rails 110 and 111 may be secured directly to the subfloor member 101 rather than to the bottom plate 106. In such an installation, however, it is desirable that the side rails be disposed at a right angle to the valleys 101a formed in the cellular subfloor member and that suitable plate-like members, not shown, having peripheral shapes corresponding to the cross-sectional shape of the valley extend down from the side rails and function as concrete barriers.

It should be noted that because all of the side rails utilized in the system have a uniform cross-sectional configuration and that there is no problem of aligning the hold-down screw holes in the cover plates with performed holes in the side rails, shipment to the job site of the duct sections in either assembled or disassembled condition is optional and thus, minimizes any problems associated with transporting products of this type. Furthermore, because the cover plate supporting portion of the connector can be used in either an inside corner mode or outside corner mode, inventory of the connectors by the manufacturer is simplified and therefore the cost of manufacturing the connector is substantially reduced. Warehousing in various geographical locations of the cover plates, side rails, connectors, and various accessories utilized in the improved system is readily possible and economically feasible because such components are of uniform configuration and can be utilized in a wide variety of layout designs.

We claim:

1. A connector for use as an inside connector in one position and as an outside corner in an inverted position in a trench duct system of a type including spaced apart elongated generally parallel side rails and removable cover plates spanning the distance between the side rails to engage correlative surfaces of the side rails, said connector comprising:

two angularly disposed leg segments forming a first generally planar surface and a second generally planar surface on a side opposite the first surface with both surfaces adapted to engage a cover plate, an acute-angle side surface and an obtuse angle side surface, and two distal end surfaces;

a first rib-like elongated portion located on and protruding above the first surface, extending alongside the acute angle side, and having a top surface generally parallel to the upper surface and raised above the first surface a height selected to form a surface coplanar with the cover plates when assembled;

a second rib-like elongated portion located on and protruding above the second surface, extending alongside the obtuse angle side, and having a surface generally parallel to the second surface and raised above the second surface a height selected to form a surface coplanar with the cover plates when assembled; and a means for fastening the connector to adjoining side rails of the trench duct sections.

2. A connector according to claim 1 wherein said side rails have elongated grooves formed in an upper surface adapted to receive fasteners extending downwardly from the cover, and wherein said first and second surfaces of the connector each have a groove running substantially parallel to and spaced apart from its correlative rib-like portion by the same distance with said distance selected to align said connector grooves with the side rail grooves when the trench duct system is assembled.

3. A connector according to claim 1 wherein said means for fastening comprises generally inflexible fingers extending from the distal ends of the leg segments and positioned to overlap and engage selected portions of the trench duct side rails, and screw fasteners attached to one of the fingers and positioned to clasp said portions of the duct sections between at least two of said fingers by the engagement of the screw to thereby connect the adjoining sections and the connectors to form the trench duct system.

4. A connector according to claim 1 wherein said connector and said side rails each comprise a means for independently vertically adjusting the respective height of the connectors and the side rails prior to being embedded in the hardenable material.

5. A connector according to claim 1 wherein said means for fastening comprises fingers extending from the distal ends of the leg segments and positioned to overlap and engage selected portions of the trench duct side rails.

6. A connector according to claim 5 wherein said means for fastening also comprises engaging means attachable to one of the fingers for clasping the portions of the duct sections between at least two of said fingers to thereby securely connect the adjoining sections and the connectors to interconnect the sections of the trench duct system.

7. A connector according to claim 5 wherein said side rails have elongated grooves formed in an upper surface adapted to receive fasteners extending downwardly from the cover, and wherein said first and second surfaces of the connector each have a groove running substantially parallel to and spaced apart from its correlative rib-like portion by the same distance with said distance selected to align said connector grooves with the side rail grooves when the trench duct system is assembled.

8. A connector for use as an inside corner connector in one position and as an outside corner connector in an inverted position in a trench duct system typically of the type installed in sections on a horizontal support and embedded in concrete poured over the support to form a floor with said sections including elongated generally parallel side rails having elongated grooves formed in an upper surface and adapted to receive screw fasteners extending downwardly from the cover and having independently vertically adjustable supports adjusted prior to pouring of the concrete, including removable cover plates spanning the distance between the side rails to engage correlative surfaces of the side rails and producing an upper surface coplanar with the floor when assembled, and including screw fasteners positioned to engage the elongated grooves and hold down the cover plate when assembled, said connector comprising:

two leg segments disposed at a right angle to each other forming a first generally planar surface on one side of the connector and a second generally planar surface parallel to the first surface on a side opposite to the first side with each side adapted to engage cover plates, an acute angle side surface and an obtuse angle side surface, and two distal end surfaces;

a first rib-like elongated portion on the first surface extending alongside the acute angle side, and protruding above the first surface to form a planar surface parallel to the first surface and at a height selected to be coplanar with the top of the cover plates when the system is assembled;

a second rib-like portion on the second surface extending alongside the obtuse angle side, and protruding above the second surface to form a planar surface parallel to the second surface at a height selected to be coplanar with the top of the cover plates when the system is assembled;

said first and second surfaces each having grooves running substantially parallel to and spaced apart from each of its correlative rib-like portions by the same distance with said distance selected to align said connector grooves with the side rail grooves when the trench duct system is assembled;

generally inflexible fingers extending from the distal ends of the leg segments and positioned to overlap and engage selected portions of the trench duct side rails; and a screw fastener attached to one of the fingers and positioned to clasp said portions of the duct sections between at least two of said fingers and the engaged screw to thereby secure the connectors to the sections of the trench duct system.

* * * * *

UNITED STATES PATENT AND TRADEMARK OFFICE
CERTIFICATE OF CORRECTION

PATENT NO. : 4,040,755
DATED : August 9, 1977
INVENTOR(S) : G.N. Jorgensen, F.D. King, & D.D. Butler It is certified that error appears in the above-identified patent and that said Letters Patent are hereby corrected as shown below:

Col. 3, line 9, change "directon" to --direction--.

Col. 3, line 27, change "portion" to --portions--.

Col. 5, line 54, change "122" to --112--.

Signed and Sealed this

Fourteenth Day of August 1979

[SEAL]

Attest:

*Attesting Officer*

LUTRELLE F. PARKER
*Acting Commissioner of Patents and Trademarks*